United States Patent
Ohga

(10) Patent No.: US 7,277,200 B2
(45) Date of Patent: Oct. 2, 2007

(54) COLOR PROCESSING METHOD AND IMAGE PROCESSING APPARATUS

(75) Inventor: Manabua Ohga, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1065 days.

(21) Appl. No.: 10/403,294

(22) Filed: Apr. 1, 2003

(65) Prior Publication Data

US 2003/0184779 A1 Oct. 2, 2003

(30) Foreign Application Priority Data

Apr. 2, 2002 (JP) .............................. 2002-100469

(51) Int. Cl.
*G06F 15/00* (2006.01)
(52) U.S. Cl. .................... 358/1.9; 358/519; 358/520
(58) Field of Classification Search ................ 358/1.9, 358/518, 519, 520, 504, 523, 524; 382/162, 382/167; 345/904; 348/180, 181, 179
See application file for complete search history.

(56) References Cited

U.S. PATENT DOCUMENTS

| | | | | |
|---|---|---|---|---|
| 5,574,664 A * | 11/1996 | Feasey | ........................ | 358/518 |
| 5,937,089 A * | 8/1999 | Kobayashi | ................... | 382/167 |
| 6,041,136 A | 3/2000 | Ohga | ........................ | 382/162 |
| 6,181,445 B1 * | 1/2001 | Lin et al. | .................... | 358/520 |
| 6,459,436 B1 | 10/2002 | Kumada et al. | ............ | 345/590 |
| 6,542,634 B1 | 4/2003 | Ohga | ........................ | 382/167 |
| 6,686,953 B1 * | 2/2004 | Holmes | ..................... | 348/179 |
| 6,760,108 B2 | 7/2004 | Ohga | ........................ | 356/406 |
| 6,999,617 B1 | 2/2006 | Ohga | | |
| 7,027,067 B1 | 4/2006 | Ohga et al. | | |
| 7,127,102 B2 * | 10/2006 | Hiramatsu et al. | .......... | 382/162 |
| 7,158,673 B2 * | 1/2007 | Nakabayashi et al. | ...... | 382/167 |
| 2002/0021833 A1 | 2/2002 | Ohga | ........................ | 382/162 |
| 2002/0031256 A1 * | 3/2002 | Hiramatsu et al. | .......... | 382/162 |
| 2002/0057434 A1 | 5/2002 | Ohga | ........................ | 356/406 |
| 2003/0117639 A1 * | 6/2003 | Milton et al. | ................ | 358/1.9 |
| 2004/0218811 A1 * | 11/2004 | Edge et al. | ................. | 382/162 |
| 2005/0220340 A1 * | 10/2005 | Nakabayashi et al. | ...... | 382/167 |

FOREIGN PATENT DOCUMENTS

JP 2002-094811 3/2002

OTHER PUBLICATIONS

U.S. Appl. No. 09/662,756, filed Sep. 15, 2000.
U.S. Appl. No. 10/238,790, filed Sep. 11, 2002.
U.S. Appl. No. 10/242,701, filed Sep. 13, 2002.

* cited by examiner

*Primary Examiner*—Kimberly A. Williams
(74) *Attorney, Agent, or Firm*—Fitzpatrick, Cella, Harper & Scinto

(57) ABSTRACT

In color matching among media having different white points or different black points, how to address gray balances among media poses a problem. To solve this problem, upon converting a colorimetric value onto a color space that connects profiles, gray-balance correction is made on the human color perception space on the basis of a media white point and gray-balance black point.

12 Claims, 9 Drawing Sheets

COLOR PROCESSING METHOD AND IMAGE PROCESSING APPARATUS

BACKGROUND OF THE INVENTION

The present invention relates to a color processing method and image processing apparatus and, more particularly, to a color process for implementing color matching in correspondence with different observation conditions and media.

FIELD OF THE INVENTION

FIG. 1 shows an outline of general color matching among different devices.

Input data as RGB data is converted into XYZ data on a device-independent color space by an input profile 1. Since colors that fall outside the color gamut of an output device cannot be expressed by the output device, the input data which has been converted into the XYZ data on the device-independent color space undergoes color space compression so that all colors fall within the color gamut of the output device. After color space compression, the input data is converted from the device-independent color space into CMYK data on a color space which depends on the output device.

In color matching, a reference white point and environmental light are fixed. For example, in a profile defined by ICC (International Color Consortium), the PCS (Profile Connection Space) used to connect profiles has XYZ values and Lab values relative to D50. For this reason, correct color reproduction of an input document and printout is guaranteed when they are observed under a light source with D50 characteristics. However, correct color reproduction is not guaranteed under a light source with other characteristics.

Upon observing an identical sample (e.g., an image) under different light sources, XYZ values relative to the sample observed under the different light sources look different from each other. In order to predict XYZ values under different light sources, transform methods such as (1) scaling, (2) Von Kries transform, (3) a prediction formula based on a color perception model, and the like can be used.

The scaling is a method of implementing W2/W1 scaling so as to convert XYZ values under reference white point W1 into those under reference white point W2. When this method is applied to an Lab uniform color space, Lab values under W1 match those under W2. For example, let (X1, Y1, Z1) be the XYZ values of a sample under W1(Xw1, Yw1, Zw1), and (X2, Y2, Z2) be the XYZ values of a sample under W2(Xw2, Yw2, Zw2). Then, according to the scaling, we have:

$$X2=(Xw2/Xw1) \cdot X1$$

$$Y2=(Yw2/Yw1) \cdot Y1$$

$$Z2=(Zw2/Zw1) \cdot Z1 \quad (1)$$

The Von Kries transform is a method of implementing W2'/W1' scaling on human color perception space PQR so as to convert XYZ values under W1 into those under W2. When this method is applied to an Lab uniform color space, Lab values under W1 do not match those under W2. According to the Von Kries transform, we have:

$$\begin{bmatrix} X2 \\ Y2 \\ Z2 \end{bmatrix} = [M^{-1}] \begin{bmatrix} P2/P1 & 0 & 0 \\ 0 & Q2/Q1 & 0 \\ 0 & 0 & R2/R1 \end{bmatrix} [M] \begin{bmatrix} X1 \\ Y1 \\ Z1 \end{bmatrix} \quad (2)$$

where $$\begin{bmatrix} P1 \\ Q1 \\ R1 \end{bmatrix} = [M] \begin{bmatrix} Xw1 \\ Yw1 \\ Zw1 \end{bmatrix} \begin{bmatrix} P2 \\ Q2 \\ R2 \end{bmatrix} = [M] \begin{bmatrix} Xw2 \\ Yw2 \\ Zw2 \end{bmatrix}$$

$$[M] = \begin{bmatrix} 0.40024 & 0.70760 & -0.08081 \\ -0.22630 & 1.16532 & 0.04570 \\ 0 & 0 & 0.91822 \end{bmatrix}$$

$$[M^{-1}] = \begin{bmatrix} 1.85995 & -1.12939 & 0.21990 \\ 0.36119 & 0.63881 & 0 \\ 0 & 0 & 1.08906 \end{bmatrix}$$

The prediction formula based on a color perception model is a method of exploiting human color perception space QMH (or JCH) like CIE CAM97s so as to convert XYZ values under observation condition VC1 (including W1) into those under observation condition VC2 (including W2). Note that Q of QMH represents the brightness; M, the colorfulness; and H, the huequadrature or hueangle. Also, J of JCH represents the lightness; C, the chroma, and H huequadrature or hueangle. When this transform method is applied to an Lab uniform color space, Lab values under W1 do not match those under W2 as in the Von Kries transform. The color perception model can implement:

(X1, Y1, Z1)→[CIE CAM97s forward transform]

→(Q, M, H) or (J, C, H)

→[CIE CAM97s inverse transform]

→(X2, Y2, Z2) $\quad (3)$

The above discussions are true when the sample is expressed on an ideal medium, i.e., on a media on which a white point corresponds to perfect reflection, and a black point corresponds to perfect absorption. However, we encounter different situations on media used in practice.

For example, since a monitor has light source colors, a white point on a medium corresponding to R=G=B=255 can be considered as a relative brightness=100%, but a black point on a medium corresponding to R=G=B=0 does not match Y=100%. Also, since a print has object colors, C=M=Y=K=0% (paper white) has some reflectance Y, and does not match Y=100%. Furthermore, C=M=Y=K=100% considered as the darkest color does not match Y=0%.

Moreover, since paper white of a print is not perfect reflection, it does not match a white point (e.g., D50) of a light source to be irradiated, and has a certain color. Likewise, device black (C=M=Y=K=100%) does not exist on the gray axis (the same chromaticity as the light source) of the light source to be irradiated.

In the following description, as shown in FIG. 7, a white point expressed on media by respective devices (a color corresponding to R=G=B=255 in an 8-bit RGB device or to C=M=Y=K=0% in a CMYK device) will be defined as a "media white point", and a black point expressed on media by respective devices (a color corresponding to R=G=B=0 in an RGB device or to C=M=Y=K=100% in a CMYK device, or a color corresponding to black based on an allowable ink dot formation amount specified depending on devices) will be defined as a "media black point". That is, the media white and black points indicate white and black points that a device can reproduce on media.

In this manner, as a "light source white point" and the "media white point", and a "light source black point" and the "media black point" are different from each other, images on different media compared under an identical light source often give different impressions. For example, when media have different white points like white paper and newspaper (recycled paper), if these media are juxtaposed and compared, a person perceives that their paper white appearances are obviously different. However, if these media are independently compared, a person perceives the white points of both the newspaper and white paper as "white". Such phenomenon occurs since the human eye accommodates itself to white.

By simply matching XYZ values under an identical light source, those of print colors may match, but paper white appearances on the backgrounds remain different, and the white background may be tinged with another color in some cases.

Likewise, as for black points of media, black points that can be expressed on media are different depending on devices. If respective media are independently compared, even when these media have different black points a person perceives these black points as "black", and the human eye also accommodates itself to black.

Among devices having different color gamuts, differences in color gamuts can be avoided by the color space compression technique. However, as for a dark part near the black point, shadows may totally look black even when the color space compression technique is used.

In order to solve these problems, color matching must be done in consideration of the media white and black points in addition to matching XYZ values under an identical light source.

Conventional white point correction and black point correction on media use a simple method for correcting the XYZ values of a sample on the basis of the black point, and then scaling the corrected values on the basis of the brightness (or reflectance) (WinColor specification). That is, let MW1(Xmw1, Ymw1, Zmw1) be the media white point, and MK1(Xmk1, Ymk1, Zmk1) be the media black point. Then, the relationship between a sample (X1, Y1, Z1) and corrected sample (X2, Y2, Z2) on media (white point correction and black point correction on media) is expressed by:

$$X2=(X1-Xmk1)/(Ymw1-Ymk1)$$

$$Y2=(Y1-Ymk1)/(Ymw1-Ymk1)$$

$$Z2=(Z1-Zmk1)/(Ymw1-Ymk1) \quad (4)$$

The ICC profile recommends that XYZ values with respect to a sample on media are expressed on the PCS (D50) relative to the media white point. However, such transform method has not been established yet, and the following simple method is used (ICC specification). That is, let MW2(Xmw2, Ymw2, Zmw2) be the media white point, and IW3(Xiw3, Yiw3, Ziw3) be the white point of a light source on the PCS. Then, the relationship between a sample (X2, Y2, Z2) and corrected sample (X3, Y3, Z3) on media (correction from the media white point to the PCS (D50)) is expressed by:

$$X3=(Xiw3/Xmw2)\cdot X2$$

$$Y3=(Yiw3/Ymw2)\cdot Y2$$

$$Z3=(Ziw3/Zmw2)\cdot Z2 \quad (5)$$

However, equations (4) and (5) do not match human color perception since they are based on the scaling on an XYZ color space. Also, equations (4) have disadvantages that the chromaticity of the white point changes depending on the XYZ values of the black point.

That is, color matching among media having different white points or different black points confronts the following problems:

(1) how to address color matching among media having different white points;

(2) how to address color matching among media having different black points; and (3) how to address color matching among media having different white points and gray-balance black points.

SUMMARY OF THE INVENTION

The present invention has been made to solve the aforementioned problems individually or together, and has as its object to satisfactorily match gray balances in color matching among media having different white and black points.

In order to achieve the above objects, a preferred embodiment of the present invention discloses an image processing method of generating conversion data, which is used in conversion between data on a device-dependent color space and data on a device-independent color space, from a calorimetric value, comprising steps of:

acquiring media white and black points;

calculating a gray-balance black points from the media white and black points;

converting the calorimetric value using the media white point and the gray-balance black point; and calculating the conversion data using the converted calorimetric value to perform gray-balance correction, wherein the gray-balance black point is calculated by changing lightness of the media white point to lightness of the media black point.

Also, a preferred embodiment of the present invention provides a color processing method of converting a color on a source-side medium into a color on a destination-side medium, in which there are obtained a white point reproducible in the source-side medium, and a gray-balance black point which has lightness equal to lightness of a black point reproducible in the source-side medium and chromaticity equal to chromaticity of the white point of the source-side medium. A white point reproducible in the destination-side medium, and a gray-balance black point which has lightness equal to lightness of a black point reproducible in the destination-side medium and chromaticity equal to chromaticity of the white point of the destination-side medium, are also obtained. A color on the source-side medium is converted into a color on the destination-side medium using the white point and gray-balance black point of the source-side medium, and the white point and gray-balance black point of the destination-side medium by converting the white point of the source-side medium into that of the destination-side medium, and by converting the gray-balance black point of the source-side medium into that of the destination-side medium.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

An image process according to an embodiment of the present invention will be described in detail hereinafter with reference to the accompanying drawings.

An image process to be described below is implemented by programs and data that implement white point correction, black point correction, gray-balance correction, and a user interface to be described later to an image processing apparatus 1 shown in FIG. 8, i.e., a computer device such a personal computer or the like. As such programs, driver software that receives an image from an image input device 2 or the like, image edit software used to edit an image, driver software such as a so-called printer driver or display driver that outputs an image to image output devices 3 and 4, color matching programs (profile builder or color matching module (CMM)), and the like are assumed.

The image process to be described later can be executed not only by a computer device but also by an image input device or image output device. Especially, when the image input device 2 such as a digital camera or the like is directly connected to the image output device 3 such as an ink-jet printer or the like, and an image sensed by the digital camera is to be printed, the image process to be described below is preferably executed by the image input device 2 or image output device 3.

Figure 8:
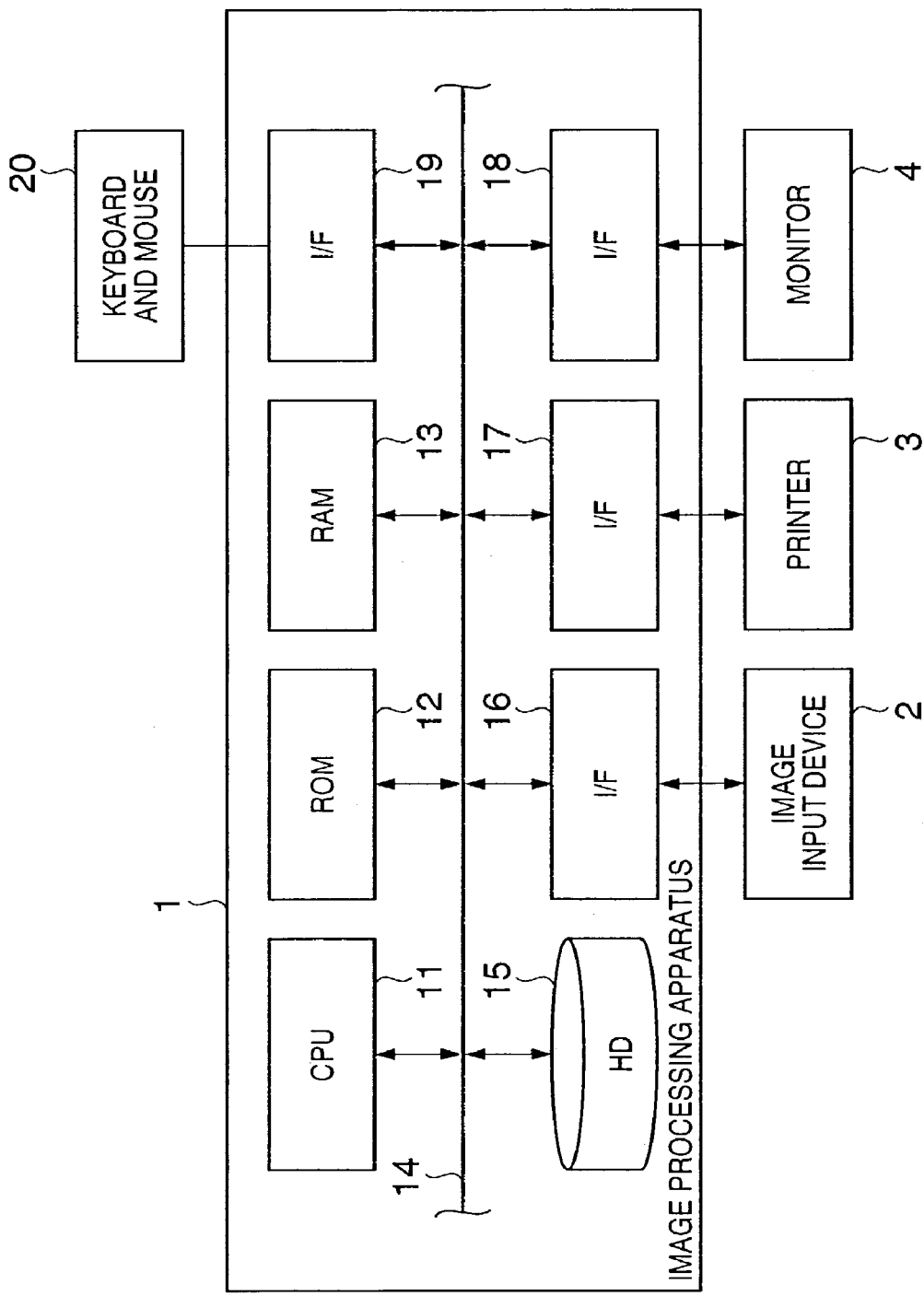
FIG. 8 is a block diagram showing the arrangement of an image processing apparatus.

FIG. 8 is a block diagram showing the arrangement of the image processing apparatus 1 that executes the image process of this embodiment. A CPU 11 controls other building components and executes an image process to be described later via a system bus 14 using a RAM 13 as a work memory in accordance with programs such as an OS, application programs, various device drivers, and the like, and data stored in a ROM 12 and hard disk (HD) 15. The HD 15 stores the aforementioned driver software, image edit software, driver software such as a printer driver, display driver, and the like, color matching programs (profile builder and color matching module (CMM)), and the like.

Various user interfaces to be described later are displayed on a monitor 4 by the CPU 11. The user inputs various instructions and data to the image processing apparatus 1 by operating a keyboard and mouse 20 in accordance with the user interface displayed on the monitor 4. The input various instructions and data are sent to the CPU 11 via the system bus 14.

Interfaces (I/Fs) 16 and 17 interposed between an image input device 2 and printer 3, and the system bus 14 can adopt serial buses such as USB, IEEE1394, and the like, parallel interfaces such as IEEE1284, SCSI, GPIB, and the like, or serial interfaces such as RS232C, RS422, and the like. Also, an I/F 18 interposed between the monitor 4 and system bus 14 can adopt an analog video interface such as VGA or the like, or a digital video interface such as DVI or the like. An I/F 18 interposed between the keyboard and mouse 20, and the system bus 14 can adopt a versatile keyboard interface and USB.

[Outline]

The image process of this embodiment implements white point correction and black point correction to make color matching among different media close to human color perception by making color transform so that grayscales (color sequences that couple white and black points) on different media match on the human color perception space in consideration of media white and black points.

It is natural to translate a problem about media white point correction to that of human color perception accommodation to a media white point rather than to a light source white point.

Also, a problem about a media black point can be translated to that of human eye accommodation not only to a white point but also to a black point.

Likewise, the image process of this embodiment allows gray-balance correction to make color matching among different media close to human color perception by making color transform so that gray balances (gray chromaticity levels at respective lightness levels match the "chromaticity of a white point") on the human color perception space match in consideration of media white and gray-balance black points.

Figure 7:
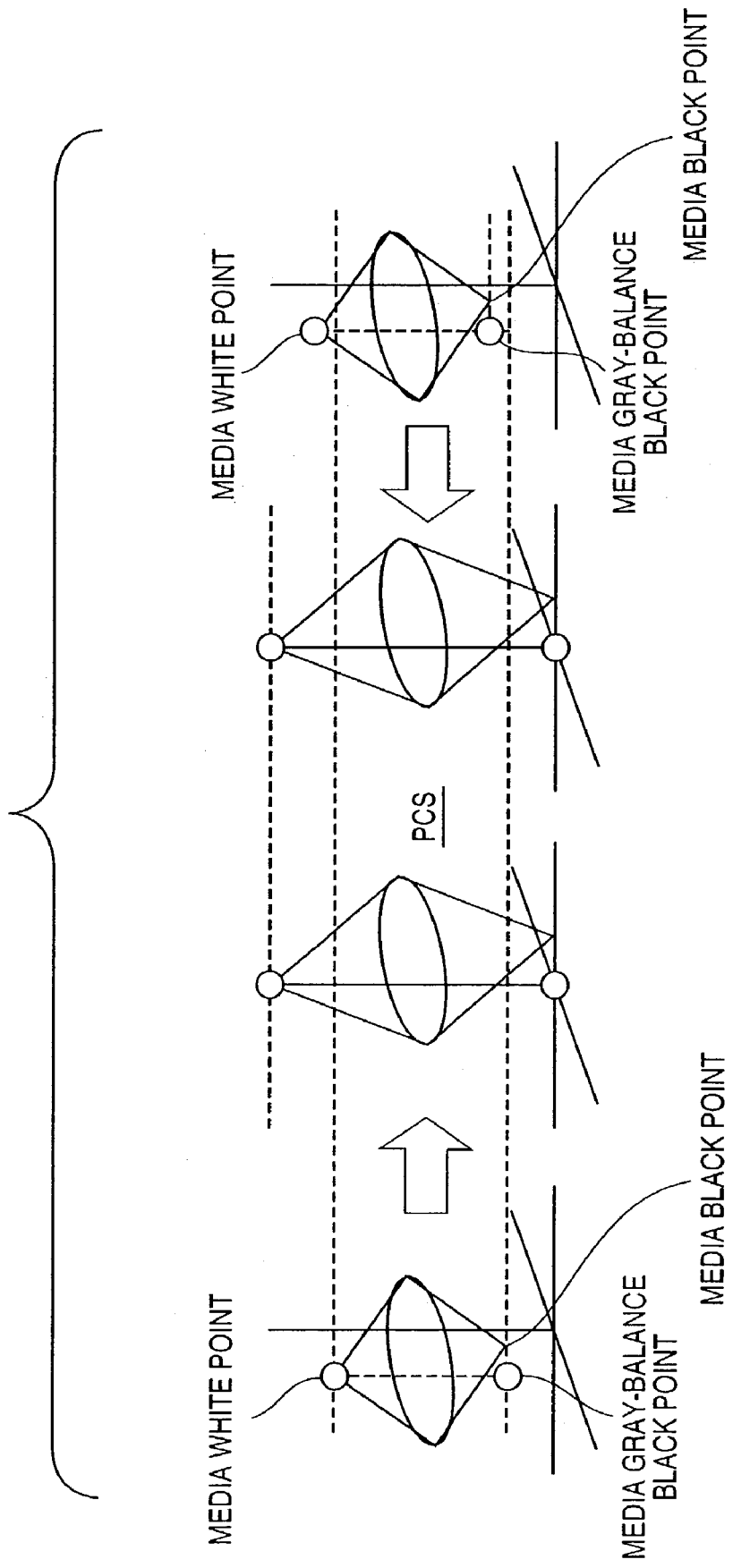
FIG. 7 is a view for explaining the media white point, black point, and gray-balance black point.

Characteristic features of the image process of this embodiment are as follows:

Assume that the media gray-balance black point is a point which has the same lightness (brightness) as that of the media black point, and has the same color appearance (chromaticity) as that of the media white point, as shown in FIG. 7.

(1) Using a chromatic adaptation model of the Von Kries transform or the like or that of CIE CAM97s or the like in white point correction among media, color matching closer to human color perception can be implemented among media having different white points.

(2) Since not only white point correction but also black point correction are made on the human color perception space, the color reproduction of a dark part can be improved.

(3) The gray color reproduction can be improved in consideration of a gray balance.

[Image Process with Intervention of PCS]

Figure 1:
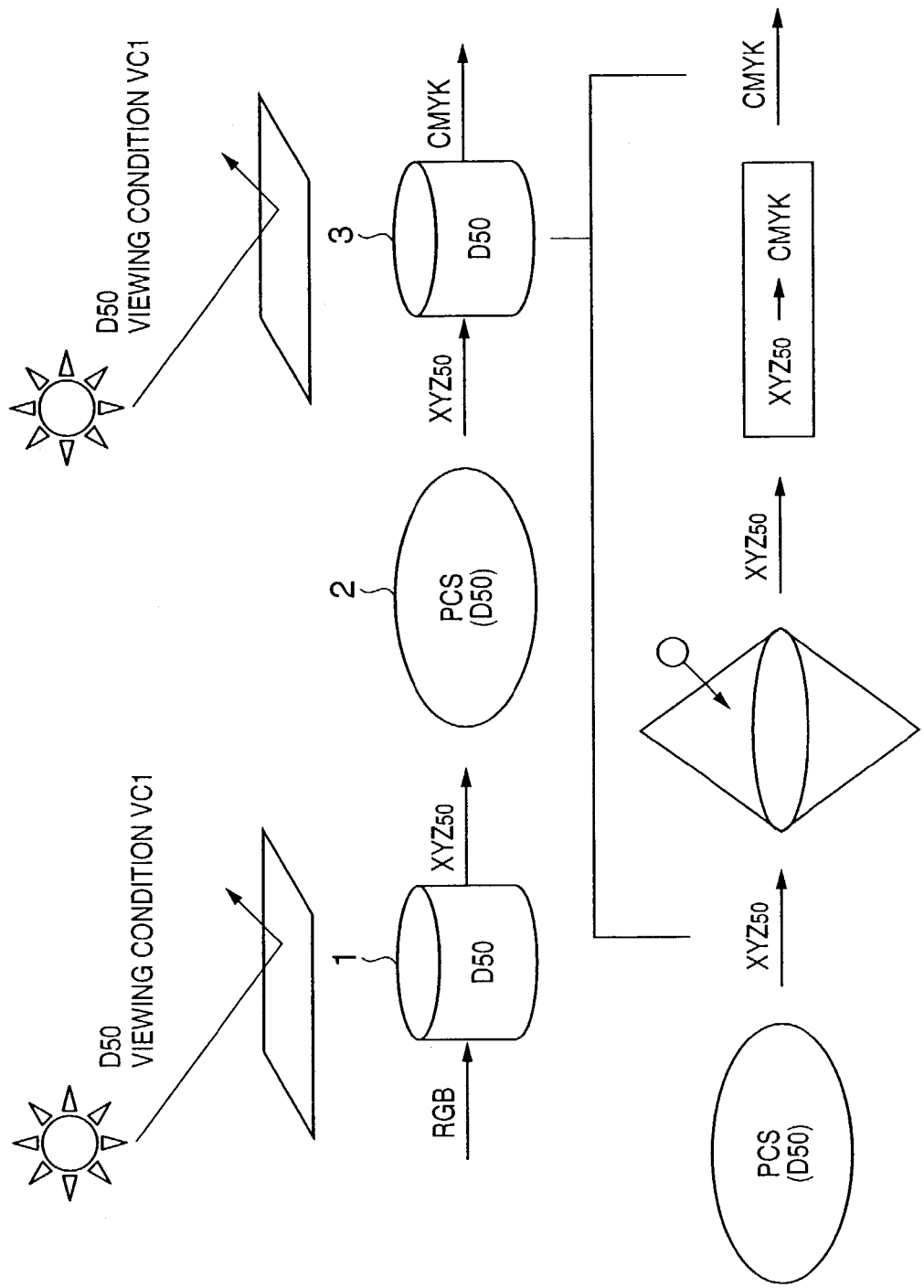
FIG. 1 is a schematic diagram showing general color matching among different devices.
Figure 2A:
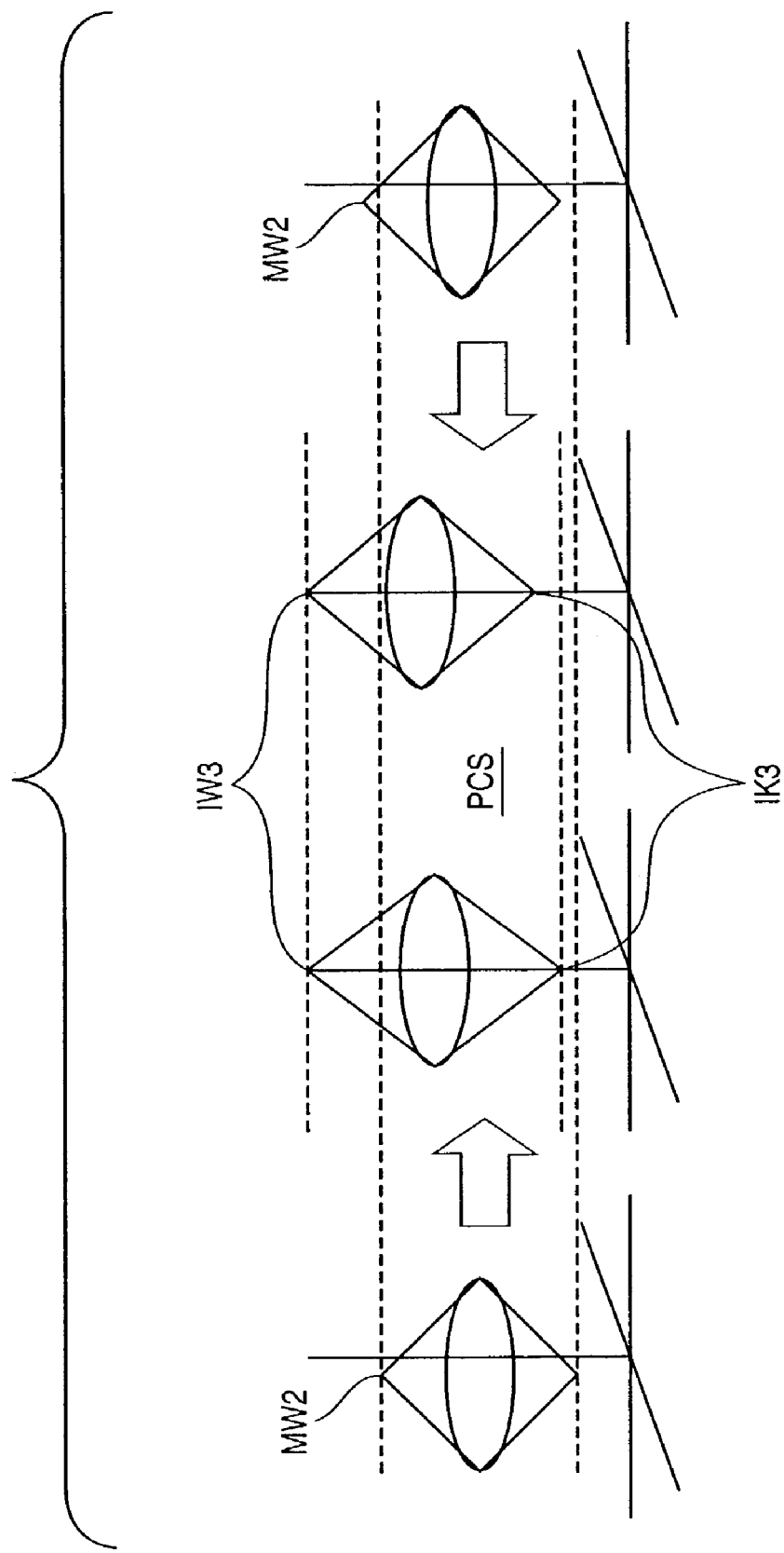
FIG. 2A is a view for explaining the result of correction based on media white points.
Figure 2B:
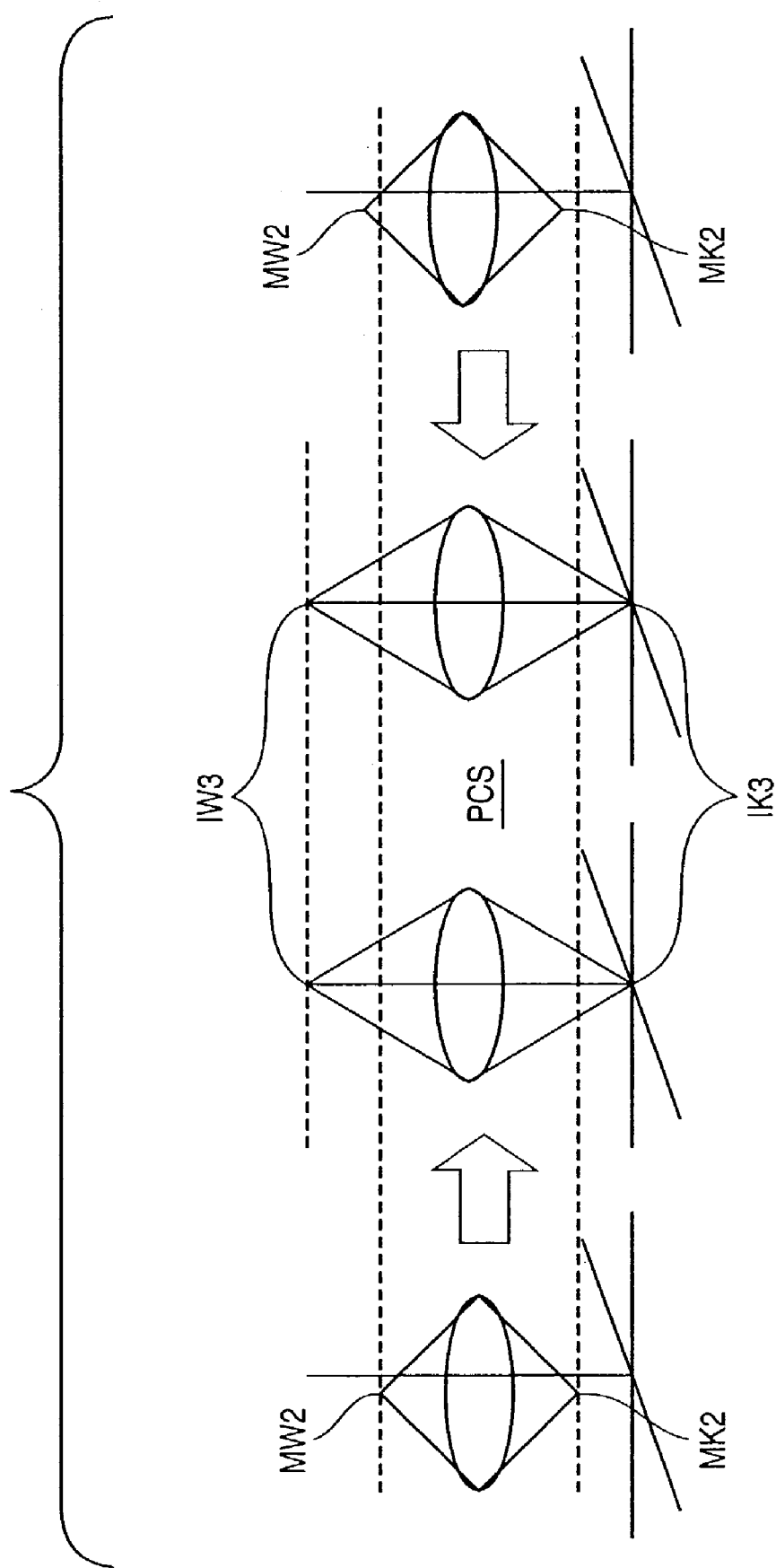
FIG. 2B is a view for explaining the result of correction based on media white and black points.

FIG. 2A shows the result of correction based on media white points, and FIG. 2B is a view for explaining the result of correction based on media white and black points. The left side in FIGS. 2A and 2B indicates the source side, and the right side indicates the destination side.

In order to implement color matching that considers media white and black points on an ICC profile, measured values (X, Y, Z) obtained by a measurement unit undergo white point correction and black point correction, and the ICC profile is generated using corrected measured values (X', Y', Z').

In a method of converting a media white point to the PCS (D50), a chromatic adaptation model is applied under the assumption that the human eye accommodates itself to a media white point. Let MW2(Xmw2, Ymw2, Zmw2) be the media white point, and IW3(Xiw3, Yiw3, Ziw3) be a D50 white point of a light source on the PCS. Then, if the Von Kries transform is used as a chromatic adaptation model, the relationship between a sample (X2, Y2, Z2) on a medium and sample (X3, Y3, Z3) on the PCS is expressed by:

$$\begin{bmatrix} X3 \\ Y3 \\ Z3 \end{bmatrix} = [M^{-1}] \begin{bmatrix} P3/P2 & 0 & 0 \\ 0 & Q3/Q2 & 0 \\ 0 & 0 & R3/R2 \end{bmatrix} [M] \begin{bmatrix} X2 \\ Y2 \\ Z2 \end{bmatrix} \quad (6)$$

where $$\begin{bmatrix} P2 \\ Q2 \\ R2 \end{bmatrix} = [M] \begin{bmatrix} Xmw2 \\ Ymw2 \\ Zmw2 \end{bmatrix} \begin{bmatrix} P3 \\ Q3 \\ R3 \end{bmatrix} = [M] \begin{bmatrix} Xiw3 \\ Yiw3 \\ Ziw3 \end{bmatrix}$$

Color space PQR converted by the 3×3 matrix [M] corresponds to a human cone response to a white point.

When white point correction alone is made, as shown in FIG. 2A, since media white point MW2 is converted into D50, the lightness of black point IK3 on the PCS (Lab) becomes higher as a result of correction. This result does not pose any problem if the white point brightness (or reflectance) of the source-side medium is nearly equal to that of the destination-side medium. However, if their difference is large, the above result may cause black to unnaturally stand out.

On the other hand, when white point correction and black point correction are made, as shown in FIG. 2B, since white points IW3 and black points IK3 on the source and destination sides match, a visible dynamic range can be assured, and black can be prevented from unnaturally standing out.

Let (Pw, Qw, Rw) be a cone response to a white point under light source IA, and (P, Q, R) be a cone response to arbitrary color N under light source IA. In the Von Kries transform, a cone response (Pw', Qw', Rw') to a white point under light source IB and a cone response (P', Q', R') to arbitrary color N under light source IB have a relationship expressed by:

*P/Pw=P'/Pw'*

*Q/Qw=Q'/Qw'*

*R/Rw=R'/Rw'* (7)

In consideration of a cone response (Pk, Qk, Rk) to a black point under light source IA and a cone response (Pk', Qk', Rk') to a black point under light source IB, the above relationship is rewritten as:

*(P−Pk)/(Pw−Pk)=(P'−Pk')/(Pw'−Pk')*

*(Q−Qk)/(Qw−Qk)=(Q'−Qk')/(Qw'−Qk')*

*(R−Rk)/(Rw−Rk)=(R'−Rk')/(Rw'−Rk')* (8)

When this relationship is applied to the method of converting media white and black points to the PCS (D50), a chromatic adaptation model in which the human eye accommodates itself to the media white and black points can be derived. That is, let MW1(Xmw1, Ymw1, Zmw1) be the media white point, MK1(Xmk1, Ymk1, Zmk1) be the media black point, IW2(Xiw2, Yiw2, Ziw2) be a D50 white point of a light source on the PCS, and IK2(Xik2, Yik2, Zik2) be a black point (0, 0, 0) of the light source on the PCS. Then, the relationship between a sample (X1, Y1, Z1) on a medium and a sample (X2, Y2, Z2) on the PCS is expressed, using, e.g., the Von Kries transform as a chromatic adaptation model, by:

$$\begin{bmatrix} X2 \\ Y2 \\ Z2 \end{bmatrix} = [M^{-1}] \begin{bmatrix} (P2w-P2k)(P-P1k)/(P1w-P1k)+P2k \\ (Q2w-Q2k)(Q-Q1k)/(Q1w-Q1k)+Q2k \\ (R2w-R2k)(R-R1k)/(R1w-R1k)+R2k \end{bmatrix} \quad (9)$$

where $$\begin{bmatrix} P \\ Q \\ R \end{bmatrix} = [M] \begin{bmatrix} X1 \\ Y1 \\ Z1 \end{bmatrix}$$

$$\begin{bmatrix} P1w \\ Q1w \\ R1w \end{bmatrix} = [M] \begin{bmatrix} Xmw1 \\ Ymw1 \\ Zmw1 \end{bmatrix} \begin{bmatrix} P1k \\ Q1k \\ R1k \end{bmatrix} = [M] \begin{bmatrix} Xmk1 \\ Ymk1 \\ Zmk1 \end{bmatrix}$$

$$\begin{bmatrix} P2w \\ Q2w \\ R2w \end{bmatrix} = [M] \begin{bmatrix} Xiw2 \\ Yiw2 \\ Ziw2 \end{bmatrix} \begin{bmatrix} P2k \\ Q2k \\ R2k \end{bmatrix} = [M] \begin{bmatrix} Xik2 \\ Yik2 \\ Zik2 \end{bmatrix}$$

Also, equation (9) can be modified as:

$$\begin{bmatrix} X2 \\ Y2 \\ Z2 \end{bmatrix} = [M^{-1}][N_G][M] \begin{bmatrix} X1-Xmk1 \\ Y1-Ymk1 \\ Z1-Zmk1 \end{bmatrix} \begin{bmatrix} Xik2 \\ Yik2 \\ Zik2 \end{bmatrix} \quad (10)$$

where $$[N_G] = \begin{bmatrix} \dfrac{P2w-P2k}{P1w-P1k} & 0 & 0 \\ 0 & \dfrac{Q2w-Q2k}{Q1w-Q1k} & 0 \\ 0 & 0 & \dfrac{R2w-R2k}{R1w-R1k} \end{bmatrix}$$

$$\begin{bmatrix} P1w \\ Q1w \\ R1w \end{bmatrix} = [M] \begin{bmatrix} Xmw1 \\ Ymw1 \\ Zmw1 \end{bmatrix} \begin{bmatrix} P1k \\ Q1k \\ R1k \end{bmatrix} = [M] \begin{bmatrix} Xmk1 \\ Ymk1 \\ Zmk1 \end{bmatrix}$$

$$\begin{bmatrix} P2w \\ Q2w \\ R2w \end{bmatrix} = [M] \begin{bmatrix} Xiw2 \\ Yiw2 \\ Ziw2 \end{bmatrix} \begin{bmatrix} P2k \\ Q2k \\ R2k \end{bmatrix} = [M] \begin{bmatrix} Xik2 \\ Yik2 \\ Zik2 \end{bmatrix}$$

Likewise, upon application to a method of converting a media white point and gray-balance black point to the PCS (D50) upon correcting a gray balance, a chromatic adaptation model in which the human eye accommodates itself to the media white and gray-balance black points can be derived. That is, let MW1(Xmw1, Ymw1, Zmw1) be the media white point, MK1(Xmk1, Ymk1, Zmk1) be the media black point, IW2(Xiw2, Yiw2, Ziw2) be a D50 white point of a light source on the PCS, and IK2(Xik2, Yik2, Zik2) be a black point (0, 0, 0) of the light source on the PCS. Then, the relationship between a sample (X1, Y1, Z1) on a medium and a sample (X2, Y2, Z2) on the PCS is also expressed by equation (9) or (10).

The gray-balance black point in this embodiment is obtained by the following calculations. That is, let (Xmw, Ymw, Zmw) be the media white point, and (Xmbk, Ymbk, Zmbk) be the media black point. Then, a corresponding gray-balance black point (Xmk, Ymk, Zmk) is calculated by:

*Xmk=Ymbk·Xmw/Ymw*

*Ymk=Ymbk*

*Zmk=Ymbk·Zmw/Ymw*

[Image Process without Intervention of PCS]

Equations (6), (9), and (10) above indicate a case with the intervention of the PCS. Alternatively, the source-side white point and destination-side white point, and the source-side black point and destination-side black point can be associated with each other without the intervention of the PCS. Such process is used in a color matching module (CMM) which directly stores colorimetric values under respective observation conditions in a private tag or the like of an ICC profile in place of PCS values, and implements color matching using the information.

In a method of converting a white point of the source-side medium to that of the destination-side medium, a chromatic adaptation model is applied under the assumption that the human eye accommodates itself to white points of respective media. That is, let MW1(Xmw1, Ymw1, Zmw1) be a white point of the source-side medium, and MW2(Xmw2, Ymw2, Zmw2) be a white point of the destination-side medium. Then, the relationship between a sample (X1, Y1, Z1) on the source-side medium and a sample (X2, Y2, Z2) on the destination-side medium is expressed, using, e.g., the Von Kries transform as a chromatic adaptation model, by:

$$\begin{bmatrix} X2 \\ Y2 \\ Z2 \end{bmatrix} = [M^{-1}] \begin{bmatrix} P2/P1 & 0 & 0 \\ 0 & Q2/Q1 & 0 \\ 0 & 0 & R2/R1 \end{bmatrix} [M] \begin{bmatrix} X1 \\ Y1 \\ Z1 \end{bmatrix} \quad (11)$$

where $$\begin{bmatrix} P1 \\ Q1 \\ R1 \end{bmatrix} = [M] \begin{bmatrix} Xmw1 \\ Ymw1 \\ Zwm1 \end{bmatrix} \begin{bmatrix} P2 \\ Q2 \\ R2 \end{bmatrix} = [M] \begin{bmatrix} Xmw2 \\ Ymw2 \\ Zmw2 \end{bmatrix}$$

In a method of converting white and black points of the source-side medium to those of the destination-side medium, a chromatic adaptation model is applied under the assumption that the human eye accommodates itself to white and black points of respective media. That is, let MW1 (Xmw1, Ymw1, Zmw1) be a white point of the source-side medium, MK1(Xmk1, Ymk1, Zmk1) be a black point of the source-side medium, MW2(Xmw2, Ymw2, Zmw2) be a white point of the destination-side medium, and MK2 (Xmk2, Ymk2, Zmk2) be a black point of the destination-side medium. Then, the relationship between a sample (X1, Y1, Z1) on the source-side medium and a sample (X2, Y2, Z2) on the destination-side medium is expressed, using, e.g., the Von Kries transform as a chromatic adaptation model, by:

$$\begin{bmatrix} X2 \\ Y2 \\ Z2 \end{bmatrix} = [M^{-1}] \begin{bmatrix} (P2w-P2k)(P-P1k)/(P1w-P1k)+P2k \\ (Q2w-Q2k)(Q-Q1k)/(Q1w-Q1k)+Q2k \\ (R2w-R2k)(R-R1k)/(R1w-R1k)+R2k \end{bmatrix} \quad (12)$$

where $$\begin{bmatrix} P \\ Q \\ R \end{bmatrix} = [M] \begin{bmatrix} X1 \\ Y1 \\ Z1 \end{bmatrix}$$

$$\begin{bmatrix} P1w \\ Q1w \\ R1w \end{bmatrix} = [M] \begin{bmatrix} Xmw1 \\ Ymw1 \\ Zmw1 \end{bmatrix} \begin{bmatrix} P1k \\ Q1k \\ R1k \end{bmatrix} = [M] \begin{bmatrix} Xmk1 \\ Ymk1 \\ Zmk1 \end{bmatrix}$$

$$\begin{bmatrix} P2w \\ Q2w \\ R2w \end{bmatrix} = [M] \begin{bmatrix} Xmw2 \\ Ymw2 \\ Zmw2 \end{bmatrix} \begin{bmatrix} P2k \\ Q2k \\ R2k \end{bmatrix} = [M] \begin{bmatrix} Xmk2 \\ Ymk2 \\ Zmk2 \end{bmatrix}$$

Equation (12) can be modified as:

$$\begin{bmatrix} X2 \\ Y2 \\ Z2 \end{bmatrix} = [M^{-1}][N_G][M] \begin{bmatrix} X1-Xmk1 \\ Y1-Ymk1 \\ Z1-Zmk1 \end{bmatrix} \begin{bmatrix} Xmk2 \\ Ymk2 \\ Zmk2 \end{bmatrix} \quad (13)$$

where $$[N_G] = \begin{bmatrix} \dfrac{P2w-P2k}{P1w-P1k} & 0 & 0 \\ 0 & \dfrac{Q2w-Q2k}{Q1w-Q1k} & 0 \\ 0 & 0 & \dfrac{R2w-R2k}{R1w-R1k} \end{bmatrix}$$

$$\begin{bmatrix} P1w \\ Q1w \\ R1w \end{bmatrix} = [M] \begin{bmatrix} Xmw1 \\ Ymw1 \\ Zmw1 \end{bmatrix} \begin{bmatrix} P1k \\ Q1k \\ R1k \end{bmatrix} = [M] \begin{bmatrix} Xmk1 \\ Ymk1 \\ Zmk1 \end{bmatrix}$$

$$\begin{bmatrix} P2w \\ Q2w \\ R2w \end{bmatrix} = [M] \begin{bmatrix} Xmw2 \\ Ymw2 \\ Zmw2 \end{bmatrix} \begin{bmatrix} P2k \\ Q2k \\ R2k \end{bmatrix} = [M] \begin{bmatrix} Xmk2 \\ Ymk2 \\ Zmk2 \end{bmatrix}$$

Likewise, the gray balance on the source-side medium can be matched with that on the destination-side medium. Let MW1(Xmw1, Ymw1, Zmw1) be a white point of the source-side medium, MK1(Xmk1, Ymk1, Zmk1) be a black point of the source-side medium, MW2(Xmw2, Ymw2, Zmw2) be a white point of the destination-side medium, and MK2(Xmk2, Ymk2, Zmk2) be a gray-balance black point of the destination-side medium. Then, the relationship between a sample (X1, Y1, Z1) on the source-side medium and a sample (X2, Y2, Z2) on the destination-side medium is expressed by equation (12) or (13) above that considers the gray balance.

Note that the gray-balance black points on the source and destination sides are obtained by the following calculations. As for the source side, let (Xmw1, Ymw1, Zmw1) be the media white point, and (Xmbk1, Ymbk1, Zmbk1) be the media black point. Then, a corresponding gray-balance black point (Xmk1, Ymk1, Zmk1) is calculated by:

$Xmk1 = Ymbk1 \cdot Xmw1/Ymw1$ $Ymk1 = Ymbk1$ $Zmk1 = Ymbk1 \cdot Zmw1/Ymw1$

As for the destination side, let (Xmw2, Ymw2, Zmw2) be the media white point, and (Xmbk2, Ymbk2, Zmbk2) be the media black point. Then, a corresponding gray-balance black point (Xmk2, Ymk2, Zmk2) is calculated by:

$Xmk2 = Ymbk2 \cdot Xmw2/Ymw2$ $Ymk2 = Ymbk2$ $Zmk2 = Ymbk2 \cdot Zmw2/Ymw2$

[Bradford Transform]

In the above description, the Von Kries transform is used as a chromatic adaptation model. Alternatively, the Bradford transform may be used.

When the Bradford transform is used, 3×3 matrices [MB] and [MB$^{-1}$] are applied in place of 3×3 matrices [M] and [M$^{-1}$] in equations (6), (9), and (10) to (13).

$$[MB] = \begin{bmatrix} 0.8591 & 0.2664 & -0.1614 \\ -0.7502 & 1.7135 & 0.0367 \\ 0.0389 & -0.0685 & 1.0296 \end{bmatrix} \quad (14)$$

$$[MB^{-1}] = \begin{bmatrix} 0.9870 & -0.1471 & 0.1600 \\ 0.4323 & 0.5184 & 0.0493 \\ -0.0085 & 0.0400 & 0.9685 \end{bmatrix}$$

[CIE CAM97s]

A color perception model may be used in place of the chromatic adaptation model. When CIE CAM97s is applied as the color perception model, equations (16) are used in place of equations (15) in forward chromatic adaptation transform of CIE CAM97s $Rc=\{D(1.0/Rw)+1-D\}R$ $Gc=\{D(1.0/Gw)+1-D\}G$ $Bc=\{D(1.0/Bw^p)+1-D\}|B|^p$  (15)

for $p=(Bw/1.0)^{0.0834}$ $D=F-F/(1+2 \cdot LA^{1/4}+LA^2/300)$ $Rc=[D\{1.0/(Rw-Rk)\}+1-D](R-Rk)$ $Gc=[D\{1.0/(Gw-Gk)\}+1-D](G-Gk)$ $Bc=[D\{1.0/(Bw-Bk)^p\}+1-D]|B-Bk|^p$  (16)

for $p=\{(Bw-Bk)/1.0\}^{0.0834}$ $D=F-F/(1+2 \cdot LA^{1/4}+LA^2/300)$ where Rw, Gw, and Bw are R, G, and B corresponding to a media white point, and Rk, Gk, and Bk are R, G, and B corresponding to a media black point. A similar substitution is made in inverse chromatic adaptation transform of CIE CAM97s.

Likewise, in consideration of the gray balance, Rw, Gw, and Bw are R, G, and B corresponding to a media white point, and Rk, Gk, and Bk are R, G, and B corresponding to a media gray-balance black point.

[User Interface]

Figure 3:
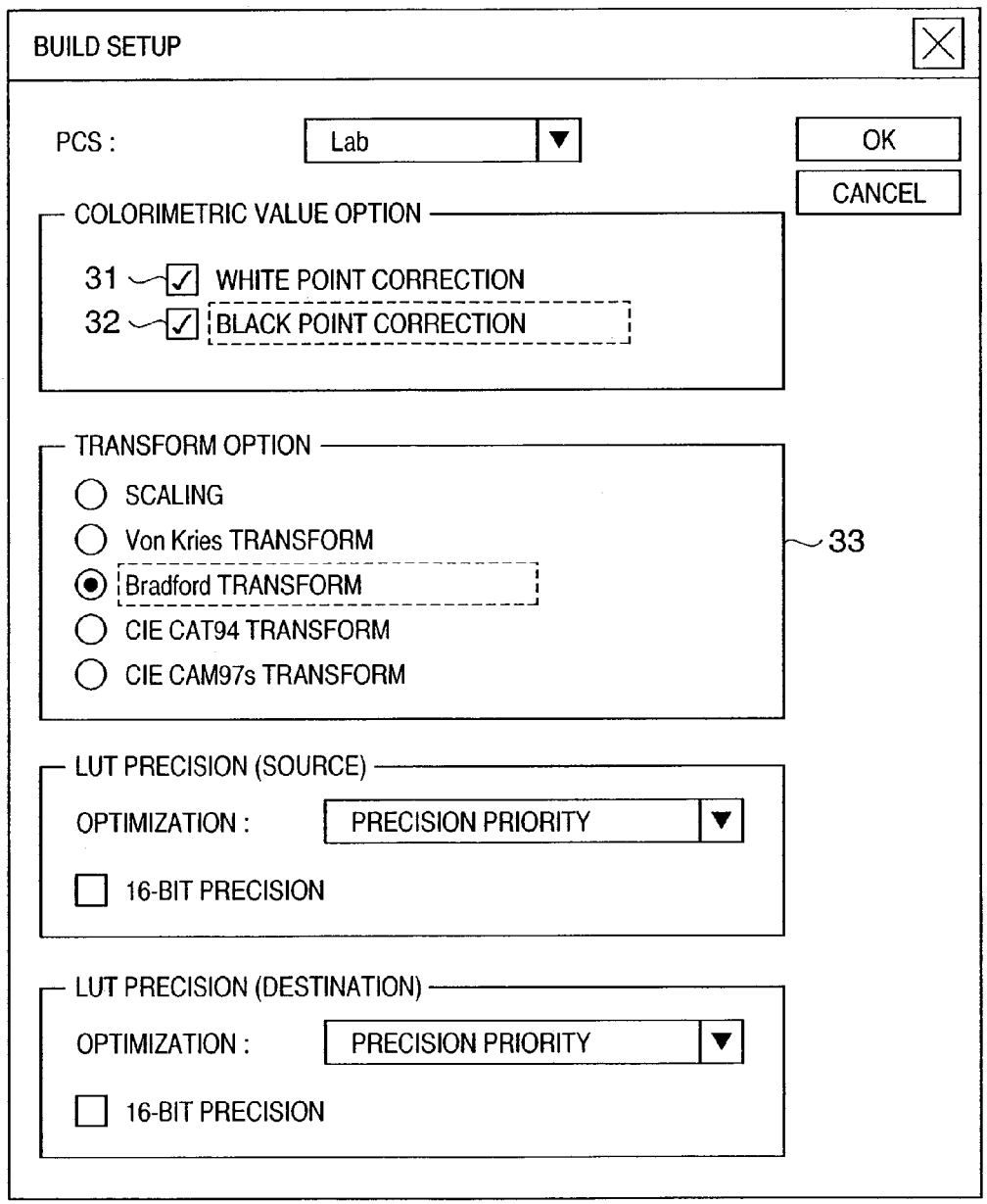
FIGS. 3 to 6 show a user interface.

Upon generating a profile, the user can select using check boxes 31 and 32 on a user interface shown in FIG. 3 whether or not white point correction and/or black point correction are/is made for a calorimetric value. That is, the user can select "white point correction=OFF, black point correction=OFF", "white point correction=ON, black point correction=OFF", "white point correction=OFF, black point correction=ON", or "white point correction=ON, black point correction=ON".

Each correction exploits, e.g., equations (6), (9), and (10). The user can also select the types of chromatic adaptation models or color perception models to be applied to that correction using radio buttons on a transform option field 33.

Figure 4:
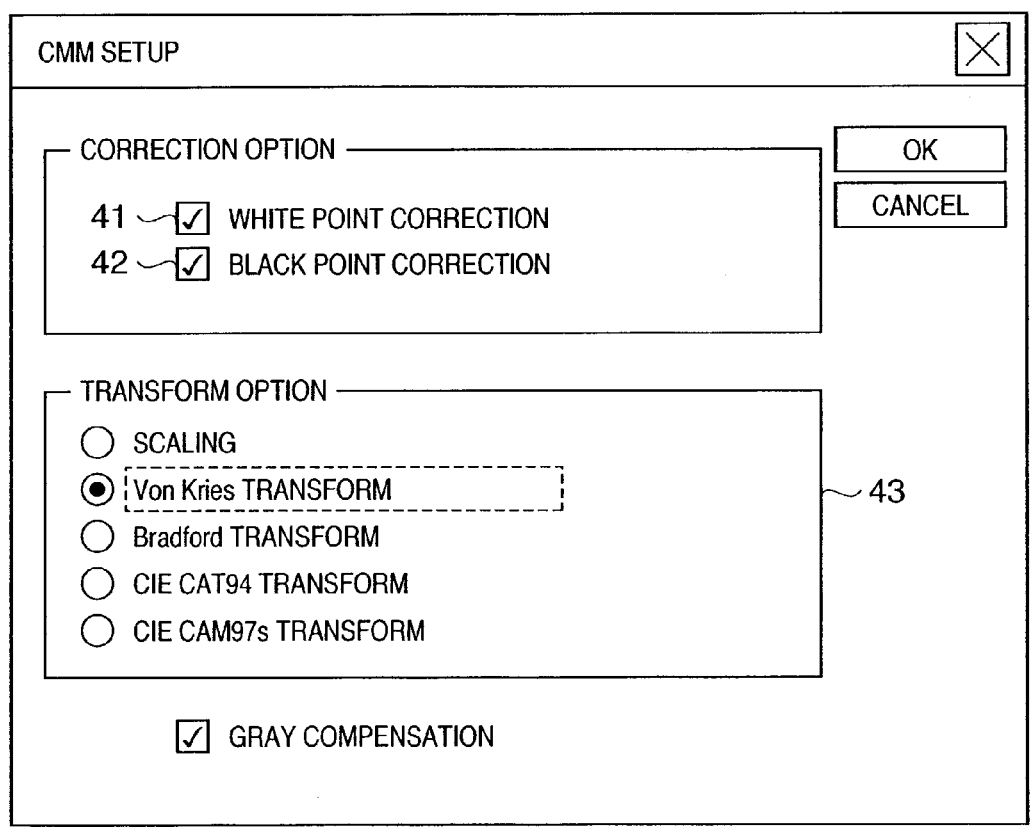

Likewise, upon making color matching, the user can select using check boxes 41 and 42 on a user interface shown in FIG. 4 whether or not white and black points of the source-side medium and those of the destination-side medium undergo white point correction and/or black point correction. Also, the user can select the types of chromatic adaptation models or color perception models to be applied to that correction using radio buttons on a transform option field 43.

Figure 5:
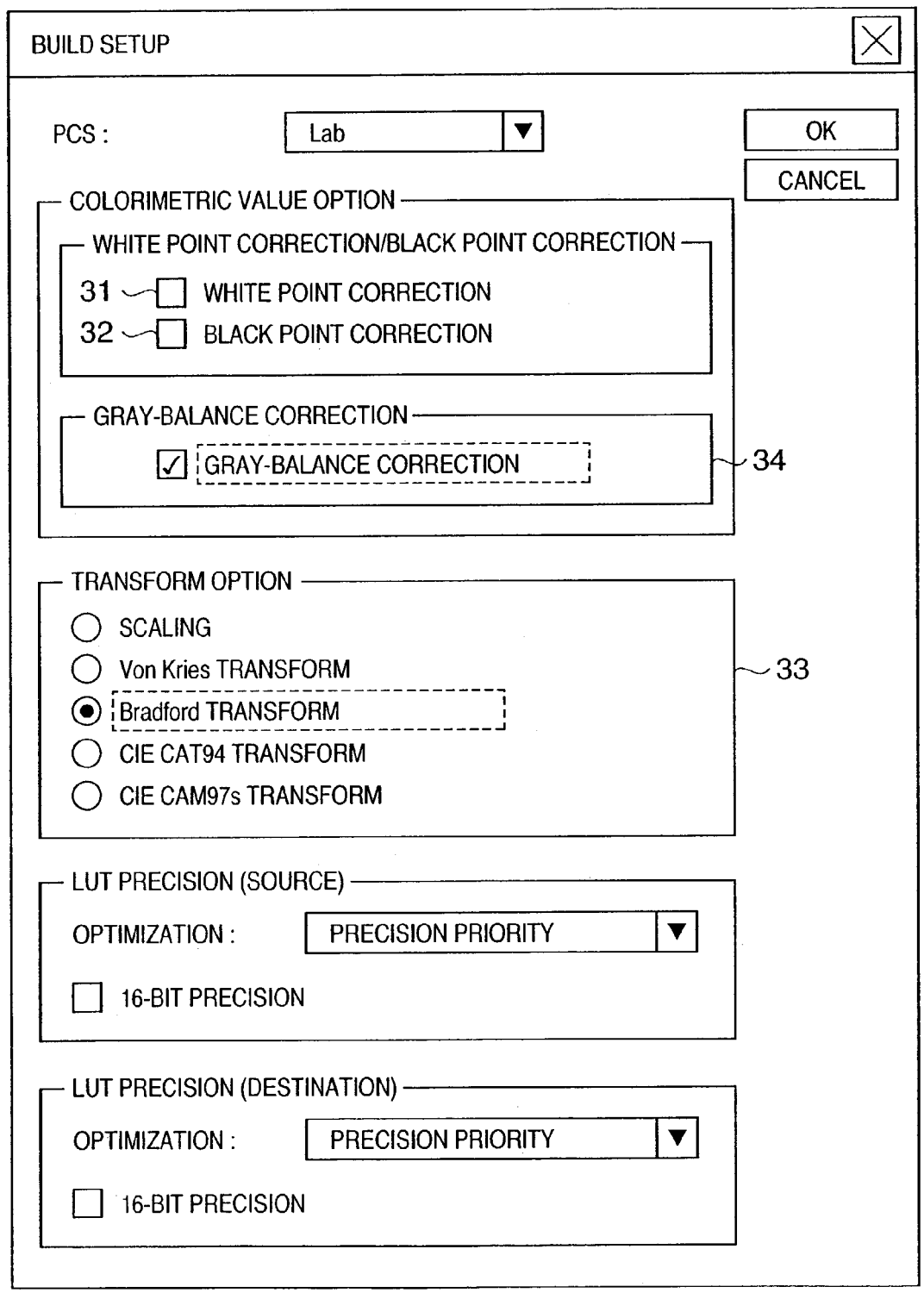
Figure 6:
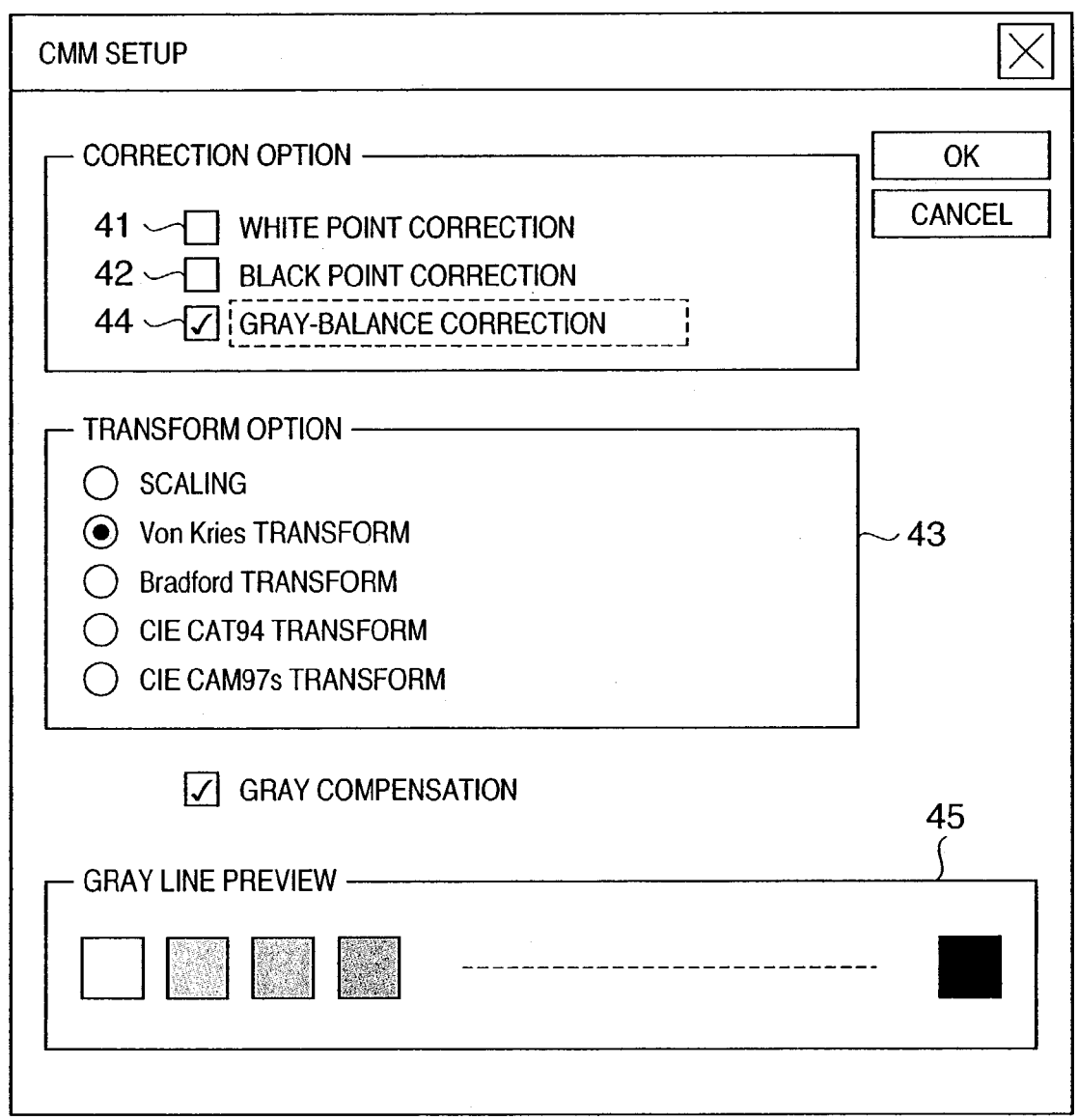

When gray-balance correction is made upon generating a profile or making color matching, the user selects one of the white point correction check box 41/black point correction check box 42 and a gray-balance correction check box 44 on user interfaces shown in FIGS. 5 and 6. Of course, the user can select the type of chromatic adaptation model or color perception model to be applied to the gray-balance correction from those in the field 43.

Gray data corrected based on the type of correction and the type of model to be applied, which are selected in this way, may be visually displayed on a preview field 45. An image including N patches is displayed in the preview field 45. Each patch shows gray of each of gradations which divide a gray line equally with N. The gray line connects between the media white point, and a black point which is selected by a user who uses the user interface, such as the gray-balance black point. When the user operates the user interface to change the media black point and the gray-balance black point, the image displayed in the preview field 45 will be changed.

In each of the above embodiments, the XYZ values are used, but Lab values may be used instead. When Lab values are used, a media gray-balance black point is a point which has the same lightness (L value) as that of the media black point, and has the same color appearance (a, b values) as that of the media white point.

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiment/embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiment/embodiments are realized by executing the program codes which are read by a computer, the present invention includes a case where an OS (operating system) or the like working on the computer performs a part or entire processes in accordance with designations of the program codes and realizes functions according to the above embodiment/embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment/embodiments.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for generating conversion data, which is used in conversion between data on a device-dependent color space and data on a device-independent color space, from a colorimetric value, comprising:

an acquisition section, arranged to acquire media white and black points;

a first calculator, arranged to calculate a gray-balance black point from the media white and black points by changing lightness of the media white point to lightness of the media black point;

a converter, arranged to convert the colorimetric value using the media white point and the gray-balance black point;

a second calculator, arranged to calculate the conversion data using the converted colorimetric value to perform gray-balance correction; and providing a user interface for setting the gray-balance correction to ON or OFF.

2. An image processing method of generating conversion data, which is used in conversion between data on a device-dependent color space and data on a device-independent color space, from a colorimetric value, comprising the steps of:

acquiring media white and black points;

calculating a gray-balance black point from the media white and black points by changing lightness of the media white point to lightness of the media black point;

converting the colorimetric value using the media white point and the gray-balance black point;

calculating the conversion data using the converted colorimetric value to perform gray-balance correction; and providing a user interface for setting the gray-balance correction to ON or OFF.

3. An image processing method of generating conversion data, which is used in conversion between data on a device-dependent color space and data on a device-independent color space, from a colorimetric value, comprising the steps of:

acquiring media white and black points;

calculating a gray-balance black point from the media white and black points by changing lightness of the media white point to lightness of the media black point;

converting the colorimetric value using the media white point and the gray-balance black point; and calculating the conversion data using the converted colorimetric value to perform gray-balance correction, providing a user interface used to select a type of conversion model used in the gray-balance correction, wherein the conversion model includes a chromatic adaptation model and color appearance model.

4. An image processing method of generating conversion data, which is used in conversion between data on a device-dependent color space and data on a device-independent color space, from a colorimetric value, comprising the steps of:

acquiring media white and black points;

calculating a gray-balance black point from the media white and black points by changing lightness of the media white point to lightness of the media black point;

converting the colorimetric value using the media white point and the gray-balance black point;

calculating the conversion data using the converted colorimetric value to perform gray-balance correction;

converting the colorimetric value using the media white and black points to perform media-black point correction; and providing a user interface used to select an output of the media-black point correction and the gray-balance correction to provide the converted colorimetric value to the calculation of the conversion data.

5. A color processing method of converting a color on a source-side medium into a color on a destination-side medium, comprising the steps of:

obtaining a white point reproducible in the source-side medium, and a gray-balance black point which has lightness equal to lightness of a black point reproducible in the source-side medium and chromaticity equal to chromaticity of the white point of the source-side medium;

obtaining a white point reproducible in the destination-side medium, and a gray-balance black point which has lightness equal to lightness of a black point reproducible in the destination-side medium and chromaticity equal to chromaticity of the white point of the destination-side medium; and converting a color on the source-side medium into a color on the destination-side medium using the white point and gray-balance black point of the source-side medium, and the white point and gray-balance black point of the destination-side medium by converting the white point of the source-side medium into that of the destination-side medium, and by converting the gray-balance black point of the source-side medium into that of the destination-side medium.

6. The method according to claim 5, wherein the converting step includes performing gray-balance correction to match gray balance of the source-side medium with gray balance of the destination-side medium.

7. The method according to claim 6, further comprising the step of providing a user interface for setting the gray-balance correction to ON or OFF.

8. The method according to claim 6, further comprising the step of providing a user interface used to select a type of conversion model used in the gray-balance correction, wherein the conversion model includes a chromatic adaptation model and color appearance model.

9. The method according to claim 5, further comprising the step of providing a user interface used to select an output of media-black point correction and gray-balance correction, wherein said converting step comprises:

performing color space conversion on color data that represents the color on the source-side medium, to convert the color data into a device-independent color space;

performing the gray-balance correction on the converted color data to match gray balance of the source-side medium with gray balance on the destination-side medium;

performing the media-black point correction on the converted color data based on the white point and black point of the source-side medium, and the white point and black point of the destination-side medium; and performing color space conversion on the color data, on which the gray-balance correction or the media-black point correction is performed, to convert the color data into color data that represents the color on the destination-side medium.

10. An image processing apparatus for converting a color on a source-side medium into a color on a destination-side medium, comprising:

- a first obtaining section, arranged to obtain a white point reproducible in the source-side medium, and a gray-balance black point which has lightness equal to lightness of a black point reproducible in the source-side medium and chromaticity equal to chromaticity of the white point of the source-side medium;
- a second obtaining section, arranged to obtain a white point reproducible in the destination-side medium, and a gray-balance black point which has lightness equal to lightness of a black point reproducible in the destination-side medium and chromaticity equal to chromaticity of the white point of the destination-side medium; and
- a converter, arranged to convert a color on the source-side medium into a color on the destination-side medium using the white point and gray-balance black point of the source side medium, and the white point and gray-balance black point of the destination-side medium by converting the white point of the source-side medium into that of the destination-side medium, and by converting the gray-balance black point of the source-side medium into that of the destination-side medium.

11. A computer-executable program stored in a computer-readable medium comprising program code causing a computer to perform a color processing method of converting a color on a source-side medium into a color on a destination-side medium, the method comprising the steps of:

- obtaining a white point reproducible in the source-side medium, and a gray-balance black point which has lightness equal to lightness of a black point reproducible in the source-side medium and chromaticity equal to chromaticity of the white point of the source-side medium;
- obtaining a white point reproducible in the destination-side medium, and a gray-balance black point which has lightness equal to lightness of a black point reproducible in the destination-side medium and chromaticity equal to chromaticity of the white point of the destination-side medium; and
- converting a color on the source-side medium into a color on the destination-side medium using the white point and gray-balance black point of the source-side medium, and the white point and gray-balance black point of the destination-side medium by converting the white point of the source-side medium into that of the destination-side medium, and by converting the gray-balance black point of the source-side medium into that of the destination-side medium.

12. A computer-executable program stored in a computer-readable medium comprising program code causing a computer to perform an image processing method of generating conversion data, which is used in conversion between data on a device-dependent color space and data on a device-independent color space, from a colorimetric value, the method comprising the steps of:

- acquiring media white and black points;
- calculating a gray-balance black points from the media white and black points by changing lightness of the media white point to lightness of the media black point;
- converting the colorimetric value using the media white point and the gray-balance black point;
- calculating the conversion data using the converted colorimetric value to perform gray-balance correction; and
- providing a user interface for setting the gray-balance correction to ON or OFF.

* * * * *

UNITED STATES PATENT AND TRADEMARK OFFICE
CERTIFICATE OF CORRECTION

PATENT NO. : 7,277,200 B2
APPLICATION NO. : 10/403294
DATED : October 2, 2007
INVENTOR(S) : Manabu Ohga It is certified that error appears in the above-identified patent and that said Letters Patent is hereby corrected as shown below:

ON THE TITLE PAGE:

Inventor line (75), "Manabua Ohga, Kanagawa (JP)" should read --Manabu Ohga, Kanagawa (JP)--.

COLUMN 4:

Line 31, "calorimetric" should read --colorimetric--;
    Line 35, "calorimetric" should read --colorimetric--; and
    Line 37, "calo-" should read --colo- --.

COLUMN 5:

Line 27, "such" should read --such as--.

COLUMN 11:

Line 17, "CIE CAM97A" should read --CIE CAM97A:--; and
    Line 52, "calorimetric" should read --colorimetric--.

COLUMN 13:

Line 48, "point; and" should read --point;--; and
    Line 50, "correction," should read --correction; and--.

UNITED STATES PATENT AND TRADEMARK OFFICE
CERTIFICATE OF CORRECTION

PATENT NO. : 7,277,200 B2
APPLICATION NO. : 10/403294
DATED : October 2, 2007
INVENTOR(S) : Manabu Ohga It is certified that error appears in the above-identified patent and that said Letters Patent is hereby corrected as shown below:

<u>COLUMN 15</u>:

Line 18, "to" should be deleted; and
    Line 20, "source side" should read --source-side--.

<u>COLUMN 16</u>:

Line 25, "points" should read --point--.

Signed and Sealed this

Third Day of June, 2008

JON W. DUDAS
*Director of the United States Patent and Trademark Office*